(12) United States Patent
Chou (10) Patent No.: US 8,586,910 B2
(45) Date of Patent: Nov. 19, 2013

(54) OPTICAL SWITCH HAVING A SLIDE DISC

(76) Inventor: Tien-Ming Chou, Taichung (TW)

( * ) Notice: Subject to any disclaimer, the term of this patent is extended or adjusted under 35 U.S.C. 154(b) by 320 days.

(21) Appl. No.: 12/963,022

(22) Filed: Dec. 8, 2010

(65) Prior Publication Data

US 2012/0145888 A1    Jun. 14, 2012

(51) Int. Cl.
*G01D 5/34* (2006.01)
*G01P 15/135* (2006.01)
*H01H 35/02* (2006.01)

(52) U.S. Cl.
USPC ................................. 250/231.1; 200/61.45 R (58) Field of Classification Search
USPC ................. 250/551, 221, 231.1; 200/61.45 R
See application file for complete search history.

(56) References Cited

U.S. PATENT DOCUMENTS

| 5,371,359 | A | 12/1994 | Hagiuda et al. | |
| 6,943,339 | B2 * | 9/2005 | Figueria et al. | 250/222.1 |
| 2009/0293296 | A1 * | 12/2009 | Mukimura | 33/365 |

FOREIGN PATENT DOCUMENTS

| DE | 19529007 A1 | 2/1996 |
| GB | 2001165 A | 1/1979 |
| JP | 5028879 A | 2/1993 |
| TW | 568480 | 12/2003 |
| WO | 03021196 A1 | 3/2003 |
| WO | 03087729 A2 | 10/2003 |

* cited by examiner

*Primary Examiner* — Thanh Luu
(74) *Attorney, Agent, or Firm* — McNees Wallace & Nurick LLC (57) ABSTRACT

An optical switch includes a housing having reflecting and mounting surfaces facing each other, and a receiving chamber formed between the reflecting and mounting surfaces. The mounting surface is recessed to form at least two mounting recesses. A sensor unit includes a light emitter and at least one light receiver disposed respectively in the mounting recesses and exposed from the mounting surface to face the reflecting surface. The light emitter is capable of emitting light to the light receiver through a reflection of the reflecting surface. A slide disc is disposed slidably but not rollably in the receiving chamber, and is slidable between a blocking position, where the slide disc blocks the light emitted from the light emitter to the light receiver, and an unblocking position, where the slide disc allows the light emitted from the light emitter to be received by the light receiver.

5 Claims, 15 Drawing Sheets

OPTICAL SWITCH HAVING A SLIDE DISC

BACKGROUND OF THE INVENTION

1. Field of the Invention

The invention relates to a switch, and more particularly to an optical switch that can be shifted to different operating modes using a slide disc.

2. Description of the Related Art

Figure 1:
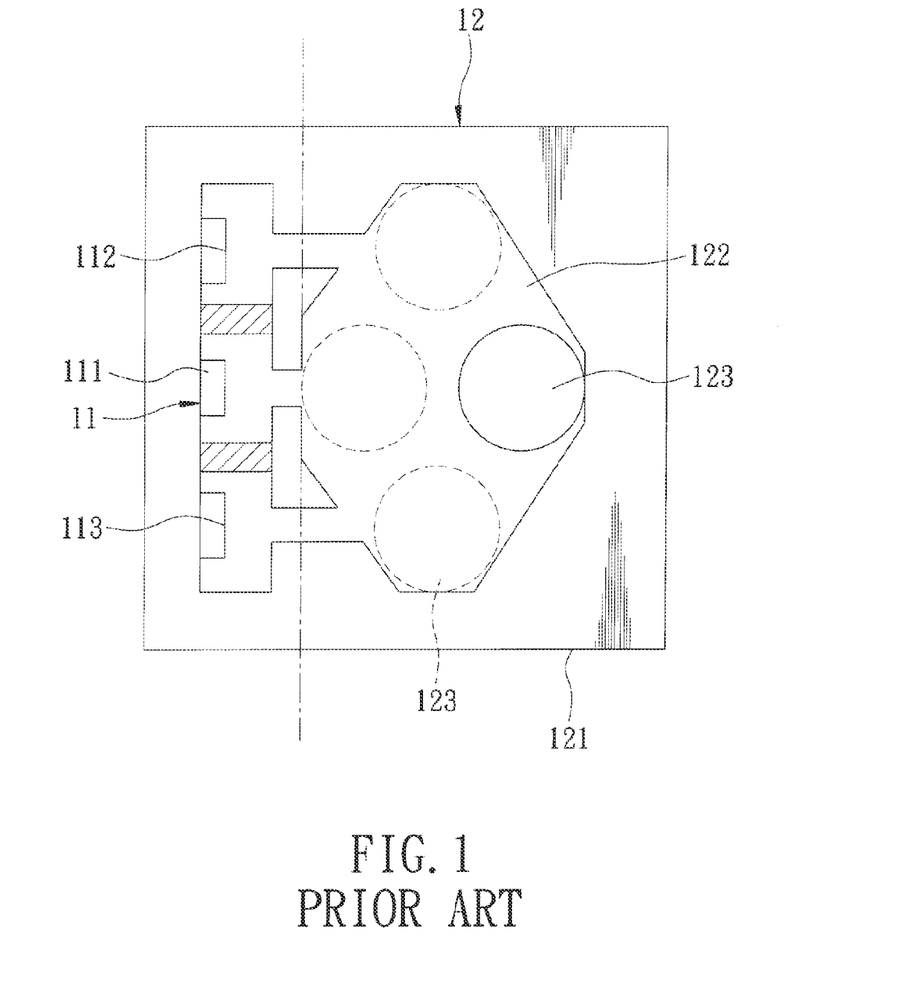
FIG. 1 is a sectional view of a conventional position-sensing device.

Referring to FIG. 1, a conventional position-sensing device for a digital camera, as disclosed in Taiwanese Patent Publication No. 568480, includes an optical module 11 and a control module 12. The optical module 11 has a light source 111, and two light-receiving devices 112, 113 disposed respectively on two opposite sides of the light source 111. The control module 12 has a main body 121, a receiving chamber 122 formed in the main body 121, and a reflective ball body 123 disposed rollably in the receiving chamber 122. When the light source 111 emits light, the light can be reflected to the light-receiving device 112 or 113 through the reflective ball body 123. According to the condition of light received by the light-receiving device 112 or 113, the position of the digital camera can be detected.

However, since an outer surface of the reflective ball body 123 is curved, the light will diverge along the curved surface of the reflective ball body 123, so that the position of the reflective ball body 123 and the angle of light after reflection cannot be easily controlled. Hence, the light-receiving devices 112 and 113 that are disposed on the same side as the light source 111 may not easily sense the light rays.

Figure 2:
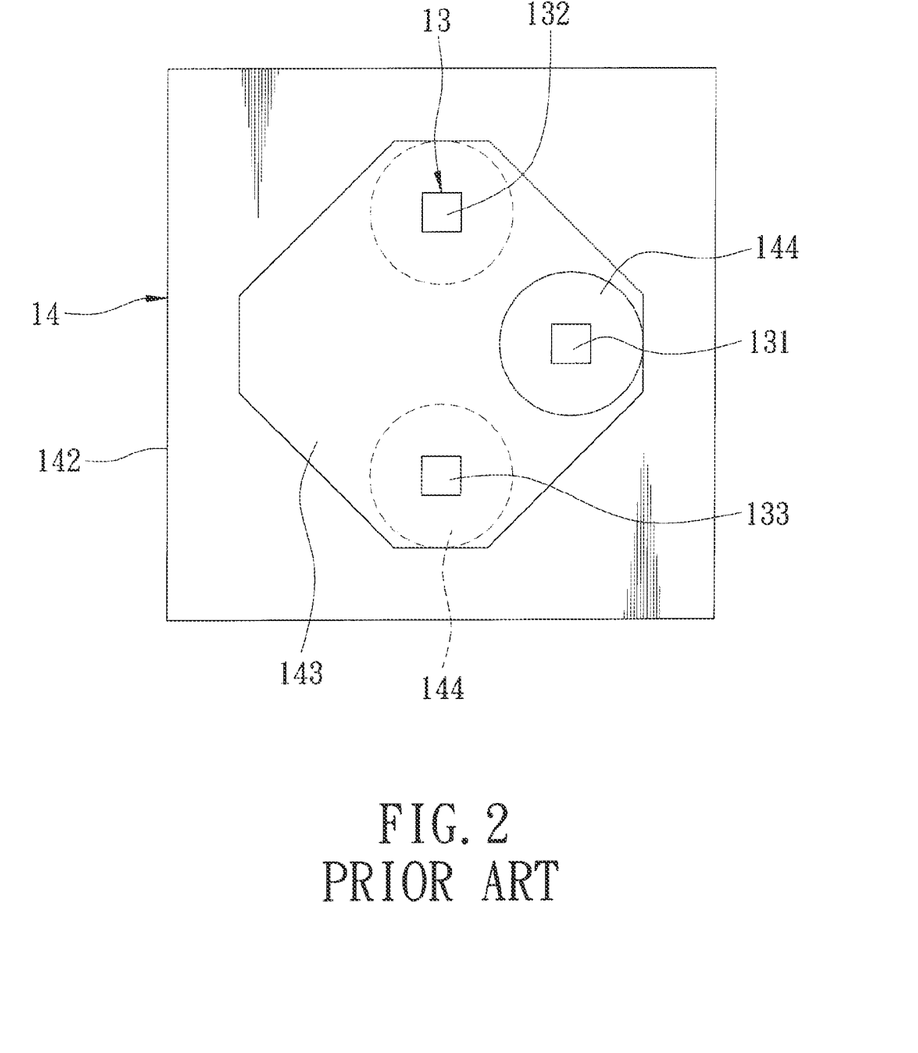
FIG. 2 is a sectional view of another conventional position-sensing device.

Referring to FIG. 2, another conventional position-sensing device similarly includes an optical module 13 and a control module 14. The optical module 13 has a light source 131, and two light-receiving devices 132, 133 that are coplanar but not collinear with the light source 131. A reflective plate (not shown) faces the optical module 13. The control module 14 has a main body 142 disposed between the optical module 13 and the reflective plate, a receiving chamber 143 formed in the main body 142, and a ball body 144 disposed rollably in the receiving chamber 143. When the light source 131 emits light, the light can be reflected to the light-receiving device 132 or 133 through the reflective plate. According to the condition of light received by the light-receiving device 112 or 113, the position of the digital camera can be detected. Similarly, since an outer surface of the ball body 144 is curved, the position of the ball body 144 and the angle of light after reflection cannot be easily controlled.

SUMMARY OF THE INVENTION

Therefore, an object of the present invention is to provide an optical switch that is sensitive and that can be operated accurately.

According to this invention, an optical switch comprises a housing, a sensor unit, and a slide disc. The housing has a reflecting surface, amounting surface facing the reflecting surface, and a receiving chamber formed between the reflecting and mounting surfaces. The mounting surface is recessed to form at least two mounting recesses. The sensor unit includes a light emitter and at least one light receiver disposed respectively in the mounting recesses and exposed from the mounting surface to face the reflecting surface. The light emitter is capable of emitting light to the light receiver through a reflection of the reflecting surface. The slide disc is disposed slidably but not rollably in the receiving chamber, and is slidable between blocking and unblocking positions. In the blocking position, the slide disc blocks the light emitted from the light emitter to the light receiver. In the unblocking position, the slide disc allows the light emitted from the light emitter to be received by the light receiver.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted that like elements are denoted by the same reference numerals throughout the disclosure.

Referring to FIGS. 3 to 12, an optical switch according to the first preferred embodiment of the present invention is shown to comprise a housing 2, a sensor unit 3, a slide disc 4, and a shutter plate 5.

Figure 3:
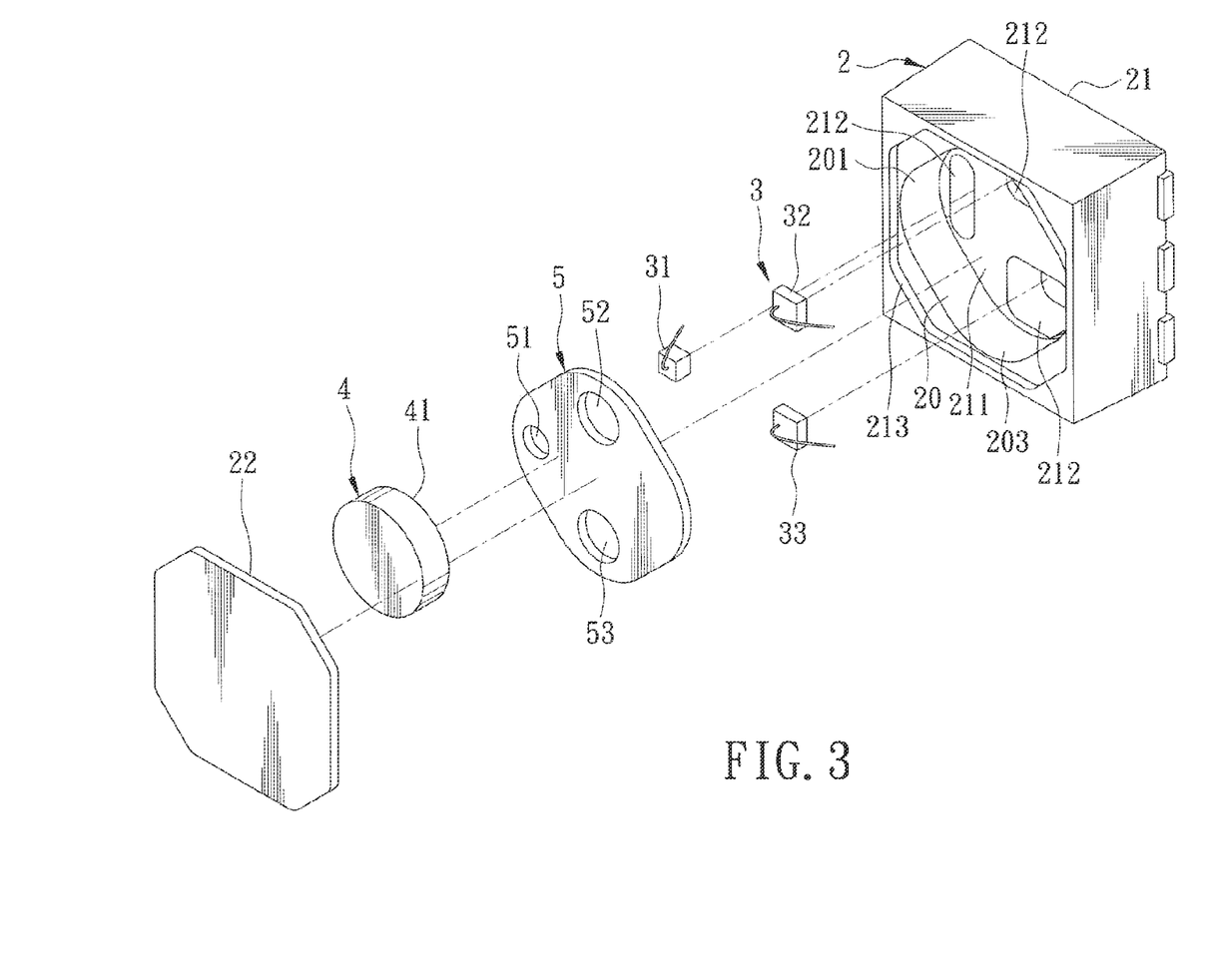
FIG. 3 is an exploded perspective view of an optical switch according to the first preferred embodiment of the present invention.
Figure 4:
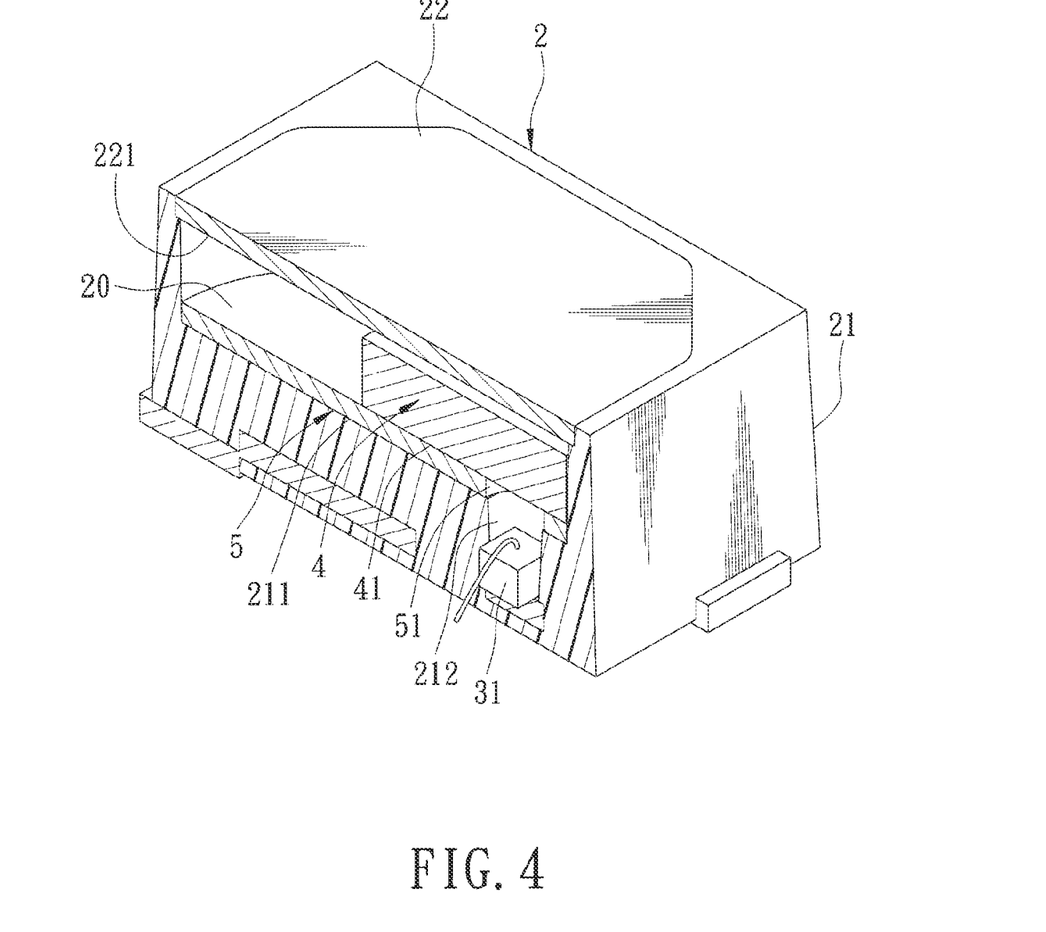
FIG. 4 is an assembled perspective view of the first preferred embodiment, with a portion of the optical device removed for clarity.

The housing 2 includes a casing part 21 and a cover part 22. The casing part 21 has one open end 213, a receiving chamber 20, and a mounting surface 211. In this embodiment, the mounting surface 211 is recessed and forms three spaced-apart mounting recesses 212. The cover part 22 covers the open end 213, and has a reflecting surface 221 facing the mounting surface 211. The receiving chamber 20 is formed between the reflecting and mounting surfaces 221, 211, and has four curved corners 201, 202, 203, 204 (see FIG. 5). The mounting recesses 212 are respectively proximate to three of the curved corners 201, 202, 203.

The sensor unit 3, in this embodiment, includes a light emitter 31 and two light receivers 32, 33 disposed respectively in the mounting recesses 212 and exposed from the mounting surface 211 to face the reflecting surface 221. The light emitter 31 is capable of emitting light that is reflected to the light receivers 32, 33 by the reflecting surface 221.

The slide disc 4, in this embodiment, is configured as a cylindrical disk that is disposed in the receiving chamber 20, that is slidable but not rollable on the mounting surface 211, and that has a flat face 41. The slide disc 4 is slidable from one of the corners 201~204 to another one of the corners 201~204.

The shutter plate 5 is disposed over the mounting surface 211 within the receiving chamber 20. The flat face 41 of the slide disc 4 is slidable on the shutter plate 5. The shutter plate 5 is used to limit the path of light exiting from the mounting recess 212 that contains the light emitter 31 and the paths of light entering the mounting recesses 212 that contain the respective light receivers 32, 33. As such, light scattering can be prevented. The shutter plate 5, in this embodiment, has three light-penetrating portions 51, 52, 53 aligned with the mounting recesses 212, respectively. Each light-penetrating portion 51, 52, 53 is configured as a through hole having a diameter smaller than that of the slide disc 4.

Figure 6:
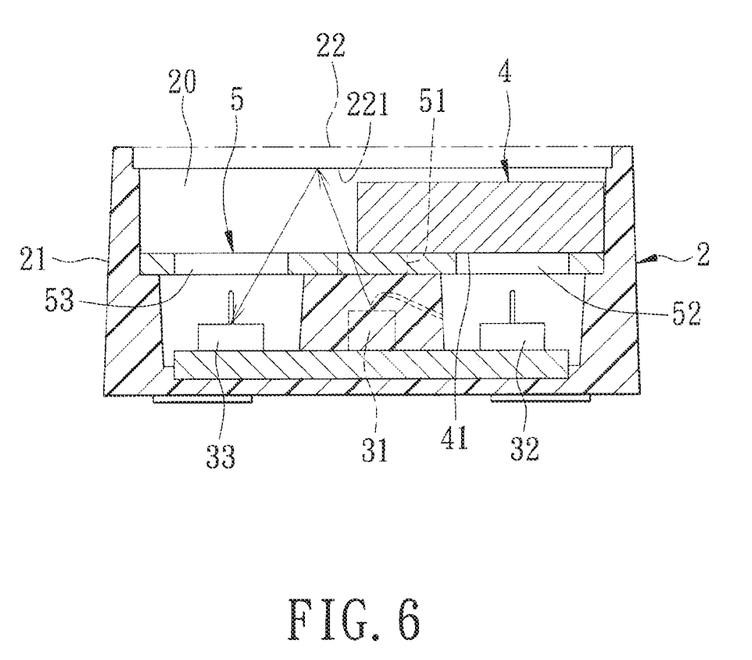
FIG. 6 is a sectional view of the first preferred embodiment taken along line VI-VI of FIG. 5.

The distance between the shutter plate 5 and the cover part 22 or the height of the receiving chamber 20 is slightly larger than the height of the slide disc 4, as best shown in FIG. 6, so that the slide disc 4 can only slide on one of the shutter plate 5 and the reflecting surface 221, and cannot turn over within the receiving chamber 20.

Figure 5:
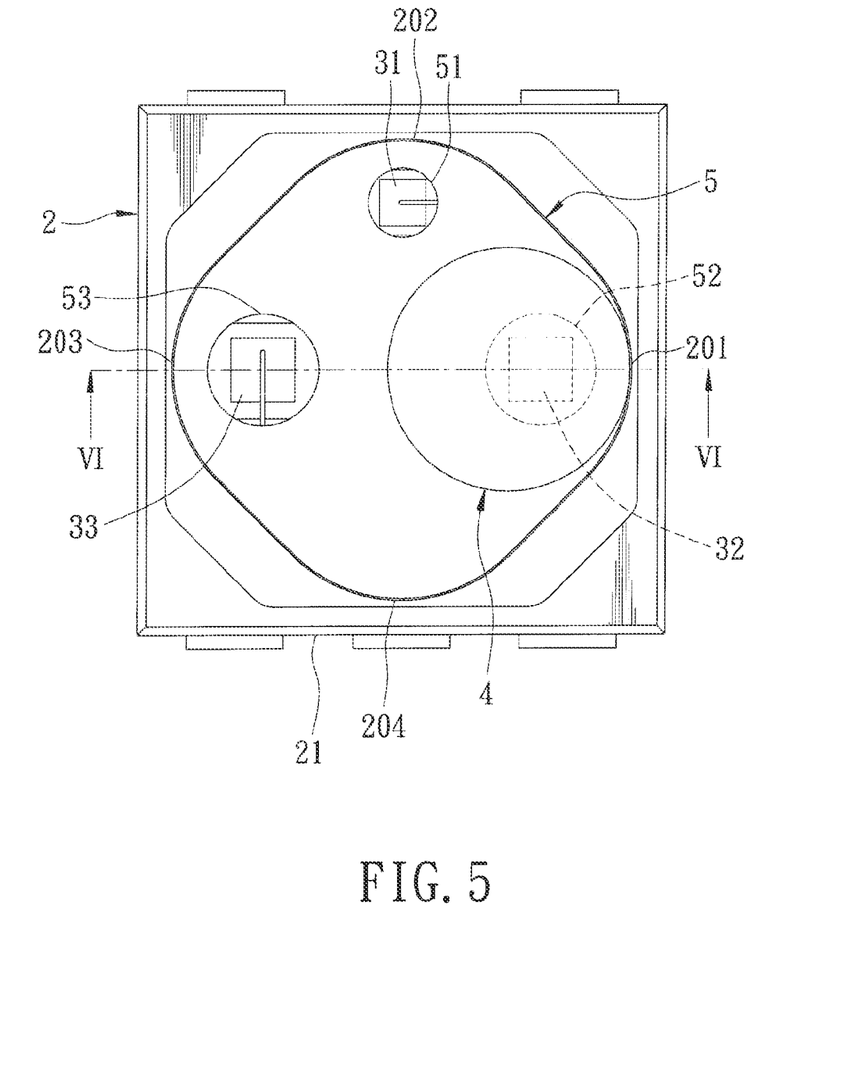
FIG. 5 is a schematic top view of the first preferred embodiment.

With reference to FIGS. 5 and 6, when the optical switch of the present invention vibrates due to an external force, and the slide disc 4 slides to the corner 201 of the receiving chamber 20, the slide disc 4 will cover the light-penetrating portion 52 of the shutter plate 5 and prevent the light emitted from the light emitter 31 from being reflected to the light receiver 32. The slide disc 4 is disposed in a first blocking position at this time. Since only the light-penetrating portion 52 is covered by the slide disc 4, the light emitted from the light emitter 31 can pass through the light-penetrating portion 51 and be reflected by the reflecting surface 221 to pass through the light-penetrating portion 53 to be received by the light receiver 33. Hence, the light receivers 32, 33 will simultaneously and respectively output electrical signals for conducting a first operating mode of the optical switch of the present invention.

Figure 7:
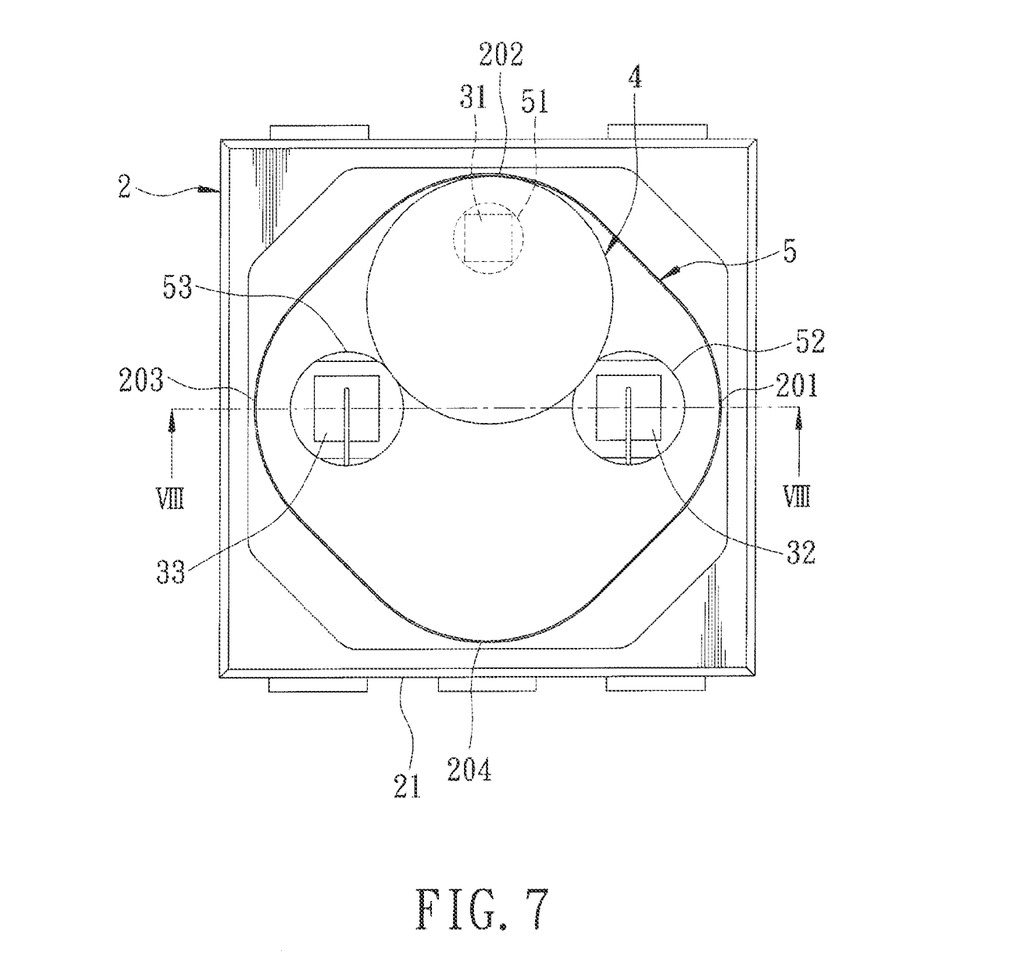
FIG. 7 is a view similar to FIG. 5, but illustrating a slide disc moving to a second position.
Figure 8:
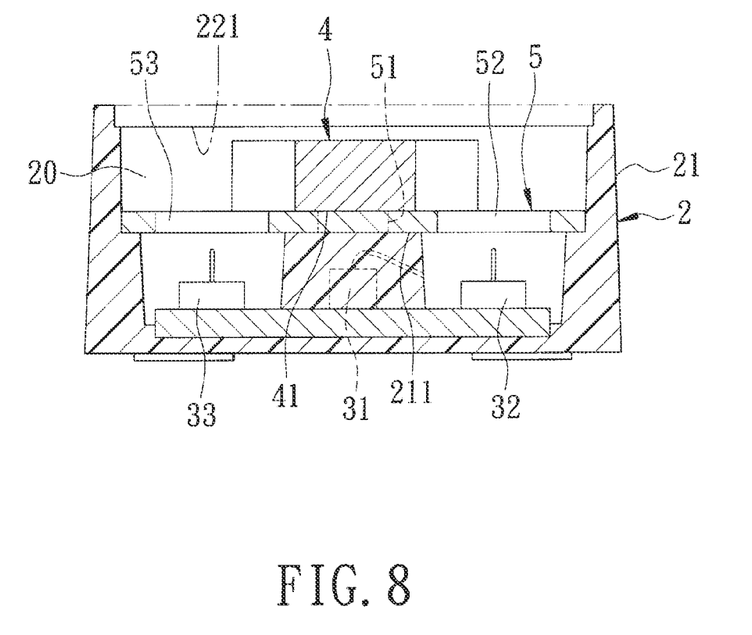
FIG. 8 is a sectional view of the first preferred embodiment taken along line VIII-VIII of FIG. 7.

With reference to FIGS. 7 and 8, when the slide disc 4 slides to the corner 202 of the receiving chamber 20, the slide disc 4 will cover the light-penetrating portion 51 of the shutter plate 5 and prevent the light emitted from the light emitter 31 from being reflected to the two light receivers 32, 33. The slide disc 4 is disposed in a second blocking position at this time. Hence, the light receivers 32, 33 will simultaneously and respectively output electrical signals for conducting a second operating mode of the optical switch of the present invention.

Figure 9:
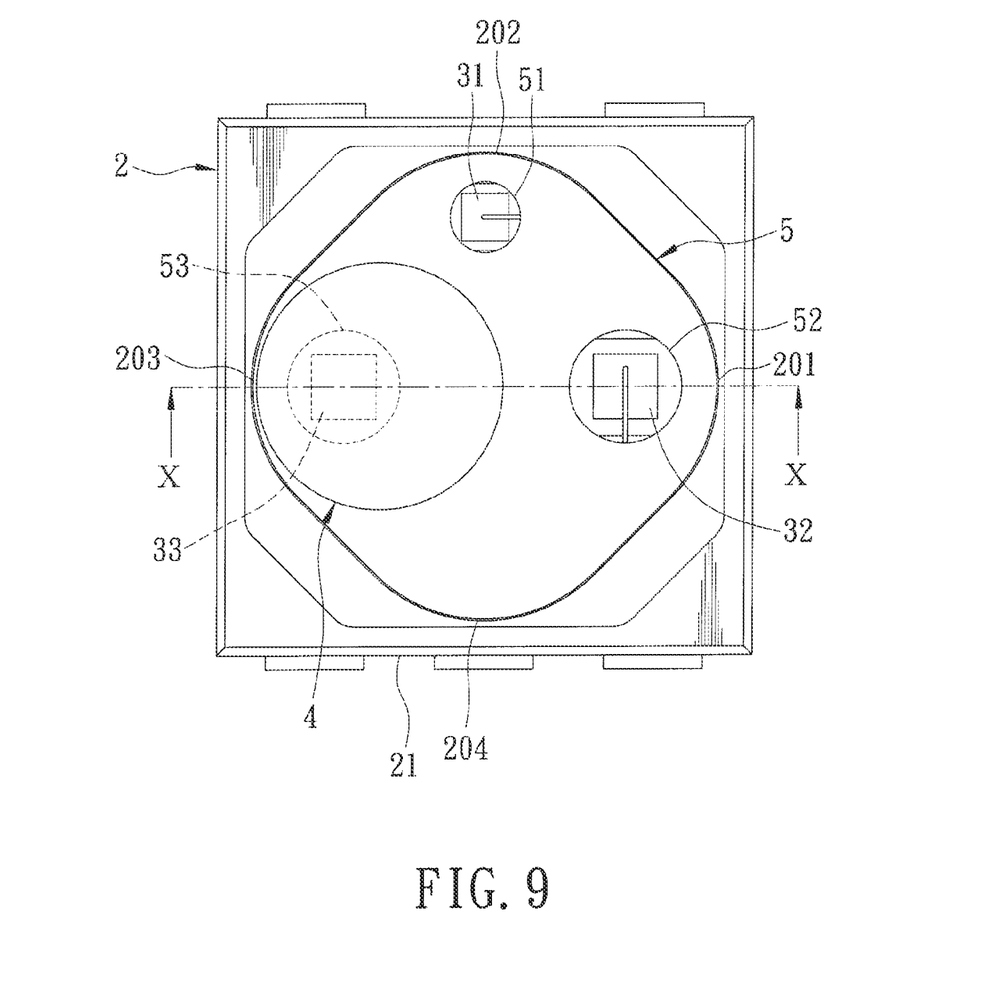
FIG. 9 is a view similar to FIG. 5, but illustrating a slide disc moving to a third position.
Figure 10:
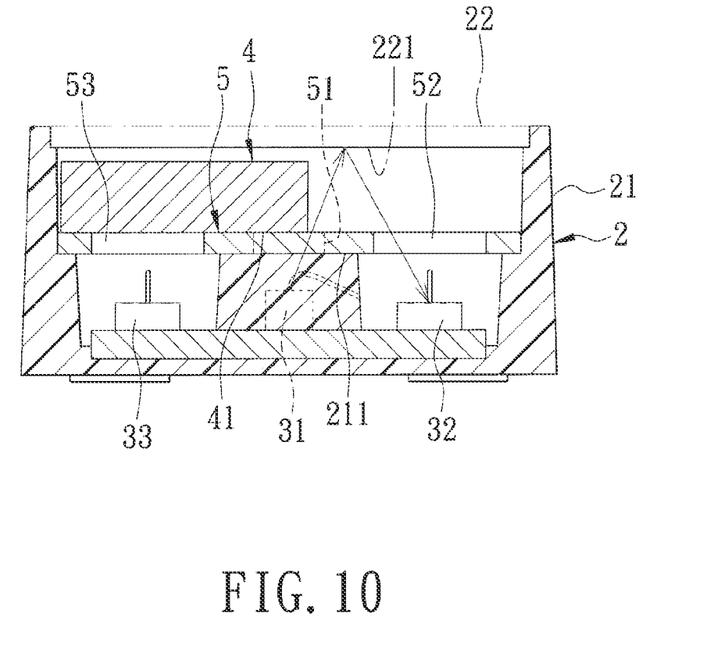
FIG. 10 is a sectional view of the first preferred embodiment taken along line X-X of FIG. 9.

With reference to FIGS. 9 and 10, when the slide disc 4 slides to the corner 203 of the receiving chamber 20, the slide disc 4 will cover the light-penetrating portion 53 of the shutter plate 5 and prevent the light receiver 33. The slide disc 4 is disposed in a third blocking position at this time. Since only the light-penetrating portion 53 is covered by the slide disc 4, the light emitted from the light emitter 31 can pass through the light-penetrating portion 51 and be reflected by the reflecting surface 221 to pass through the light-penetrating portion 52 to be received by the light receiver 32. Hence, the light receivers 32, 33 can simultaneously and respectively output electrical signals for conducting a third operating mode of the optical switch of the present invention.

Figure 11:
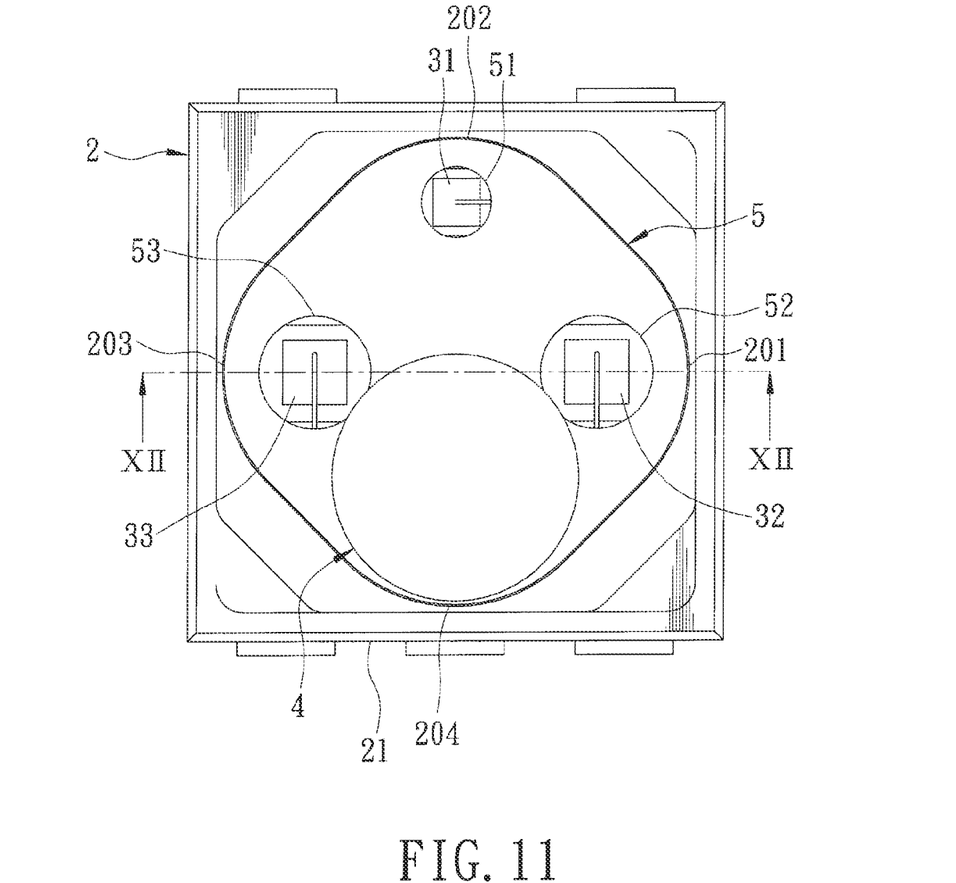
FIG. 11 is a view similar to FIG. 5, but illustrating a slide disc moving to a fourth position.
Figure 12:
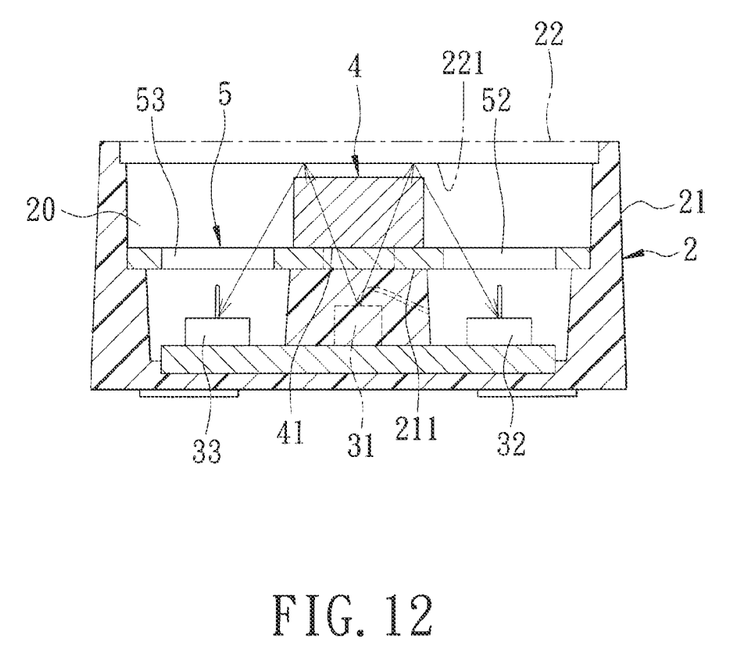
FIG. 12 is a sectional view of the first preferred embodiment taken along line XII-XII of FIG. 11.

With reference to FIGS. 11 and 12, when the slide disc 4 slides to the corner 204 of the receiving chamber 20, the slide disc 4 will not cover any of the light-penetrating portions 51, 52, 53 of the shutter plate 5, thereby being disposed in an unblocking position.

The light emitted from the light emitter 31 can pass through the light-penetrating portion 51 and be reflected by the reflecting surface 221 to be received by the two light receivers 32, 33. Hence, the light receivers 32, 33 can simultaneously and respectively output electrical signals for conducting a fourth operating mode of the optical switch of the present invention.

Figure 13:
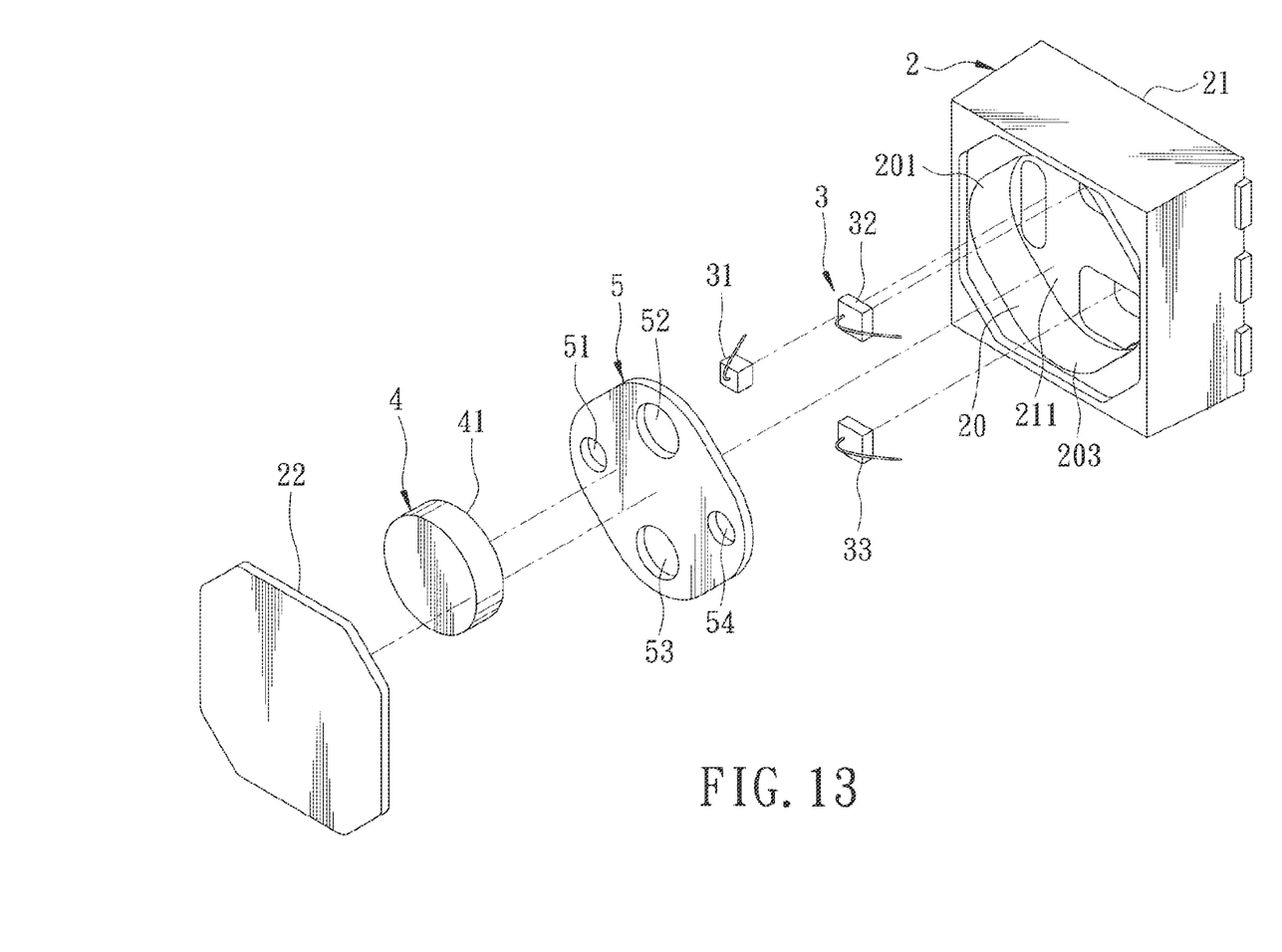
FIG. 13 is an exploded perspective view of an optical switch according to the second preferred embodiment of the present invention.

Referring to FIG. 13, an optical switch according to the second preferred embodiment of the present invention is shown to be similar to the first preferred embodiment. However, in this embodiment, the shutter plate 5 includes four light-penetrating portions 51, 52, 53, 54 that are spaced apart from each other. Through such a configuration, the shutter plate 5 can be disposed inside the casing part 22 without having to consider which face is facing the mounting surface 211. Hence, simplicity during assembly is enhanced.

Figure 14:
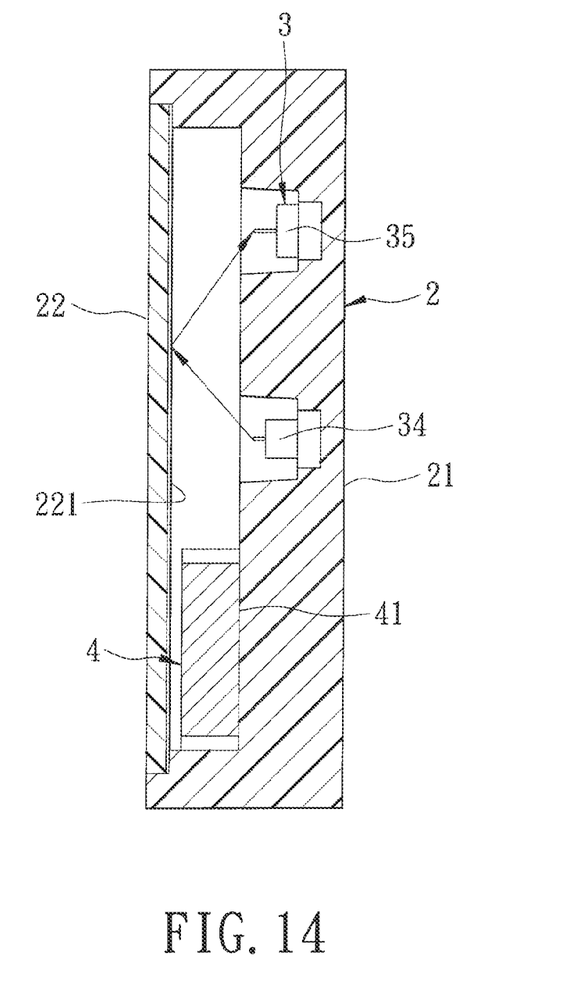
FIG. 14 is a sectional view of an optical switch according to the third preferred embodiment of the present invention.
Figure 15:
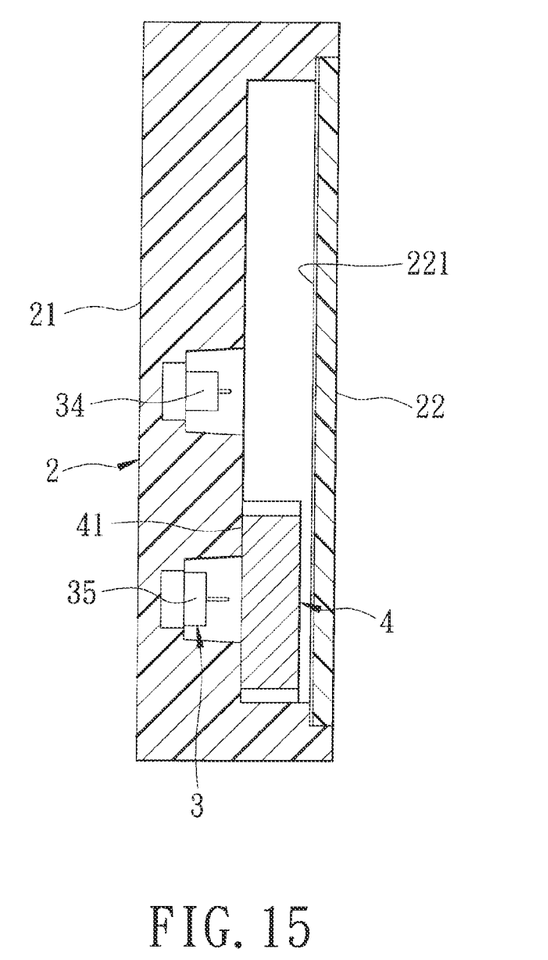
FIG. 15 is another sectional view of the third preferred embodiment.

Referring to FIGS. 14 and 15, an optical switch according to the third preferred embodiment of the present invention is shown to be similar to the first preferred embodiment. Particularly, the optical switch comprises a housing 2, a sensor unit 3, and a slide disc 4. However, in this embodiment, the sensor unit 3 has only one light receiver 35, and the light emitter 34 and the light receiver 35 are arranged in a straight line.

When the housing 2 is turned, as shown in FIG. 14, the slide disc 4 can move to an unblocking position so that the light emitted from the light emitter 34 can be received by the light receiver 35. The light receiver 35, at this time, can output an electrical signal for conducting a fifth operating mode of the optical switch of the present invention. When the housing 2 is turned, as shown in FIG. 15, the slide disc 4 can move to a blocking position so that the light emitted from the light emitter 34 cannot be received by the light receiver 35. The light receiver 35, at this time, can output an electrical signal for conducting a sixth operating mode of the optical switch of the present invention.

The advantages and efficiencies of the optical switch of the present invention can be summarized as follows:

1. Since the slide disc 4 of the present invention is configured as a cylindrical disk, not only is the height of the whole structure reduced, the flat face 41 of the slide disc 4 can readily slide over any one of the light-penetrating portions 51, 52, 53, 54 of the shutter plate 5, so that the light-penetrating portions 51, 52, 53, 54 will not interfere with or affect the sliding movement of the slide disc 4 on the shutter plate 5. Hence, the slide disc 4 can slide smoothly to the right position according to an angle of rotation of the housing 2. The sensitivity of motion of the optical switch can thus be enhanced. If the slide disc 4 of the present invention is replaced by a ball body, such as that disclosed in the aforesaid conventional position-sensing device shown in FIGS. 1 and 2, the curved surface of the ball body may interfere with the light-penetrating portions 51, 52, 53, 54 of the shutter plate 5 and affect the sliding movement of the slide disc 4 on the shutter plate 5. In this case, the sensitivity of the optical switch can be adversely affected.

2. In assembly, the sensor unit 3, the shutter plate 5, and the slide disc 4 are consecutively mounted in the casing part 21, after which the cover part 22 covers the casing part 21. Hence, only one seam existing between the casing part 21 and the cover part 22 needs to be sealed.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. An optical switch comprising:

a housing having a reflecting surface, a mounting surface facing said reflecting surface, and a receiving chamber formed between said reflecting and mounting surfaces, said mounting surface being recessed to form at least two mounting recesses;

a sensor unit including a light emitter and at least one light receiver disposed respectively in said mounting recesses and exposed from said mounting surface to face said reflecting surface, said light emitter being capable of emitting light to said light receiver through a reflection of said reflecting surface;

a slide disc disposed in said receiving chamber and movable between a blocking position, where said slide disc blocks the light emitted from said light emitter to said light receiver, and an unblocking position, where said slide disc allows the light emitted from said light emitter to be received by said light receiver; and a shutter plate mounted on said mounting surface within said receiving chamber and having at least two light-penetrating portions aligned with said mounting recesses, respectively;

wherein said slide disc has a flat face slidable, but not rollable, on said shutter plate; and wherein said housing includes a casing part having a closed end and an open end opposite the closed end, and a cover part covering said open end, said casing part being a single, integral piece having said closed end, said mounting surface, said mounting recesses and said receiving chamber, said cover part having said reflecting surface facing said mounting surface.

2. The optical switch of claim 1, wherein said mounting surface is recessed to form three said mounting recesses, said sensor unit including two said light receivers exposed from said mounting surface, wherein, when said slide disc is in said blocking position, said slide disc blocks the light emitted by said light emitter to one of said light receivers, so that the other one of said light receivers can receive the light emitted by said light emitter.

3. The optical switch of claim 2, wherein said receiving chamber has four corners, said slide disc being slidable from one of said corners to another one of said corners, said mounting recesses being proximate to three of said corners.

4. The optical switch of claim 1, wherein each of said light-penetrating portions is configured as a through hole.

5. The optical switch of claim 1, wherein said slide disc is configured as a cylindrical disk.

* * * * *